Feb. 18, 1947.  R. R. CANDOR  2,416,084
DOMESTIC APPLIANCE
Filed July 19, 1943  7 Sheets-Sheet 1

INVENTOR.
Robert R. Candor
BY

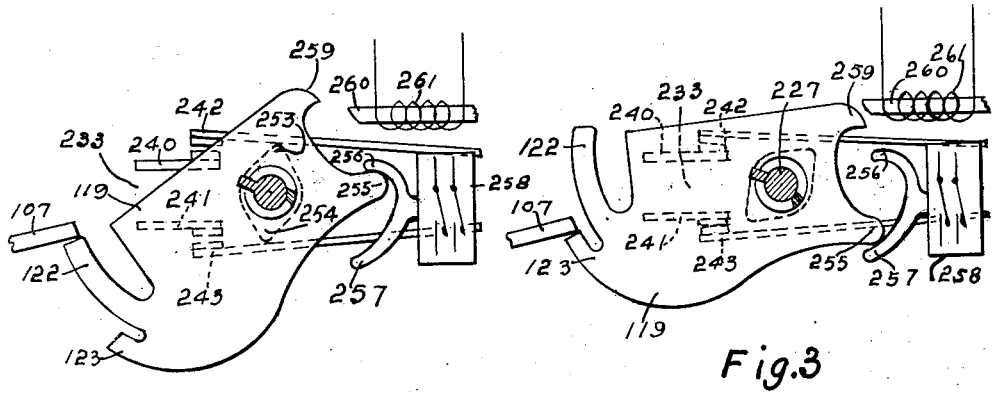
Fig. 2   Fig. 3
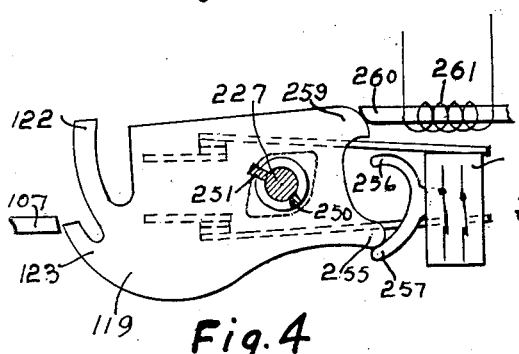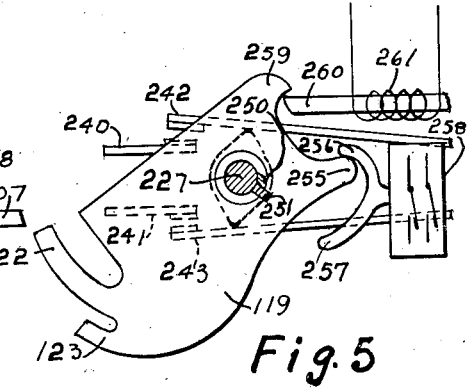
Fig. 4   Fig. 5
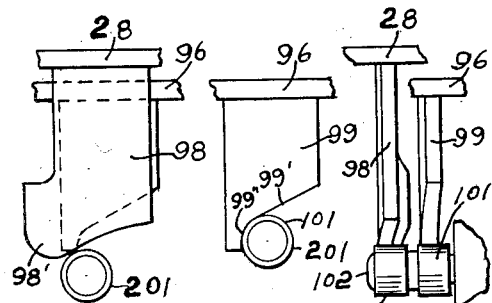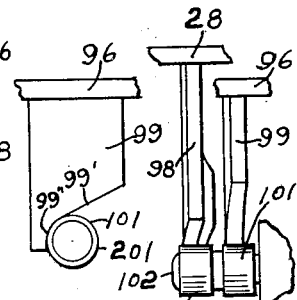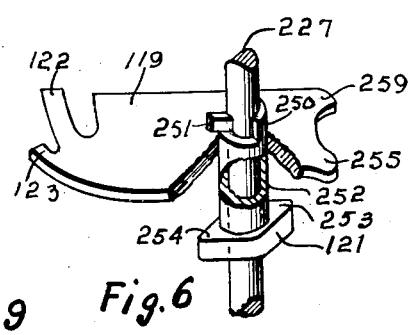
Fig. 8   Fig. 7   Fig. 9   Fig. 6
INVENTOR.
Robert R. Candor
BY Spencer Hardman & Hulse

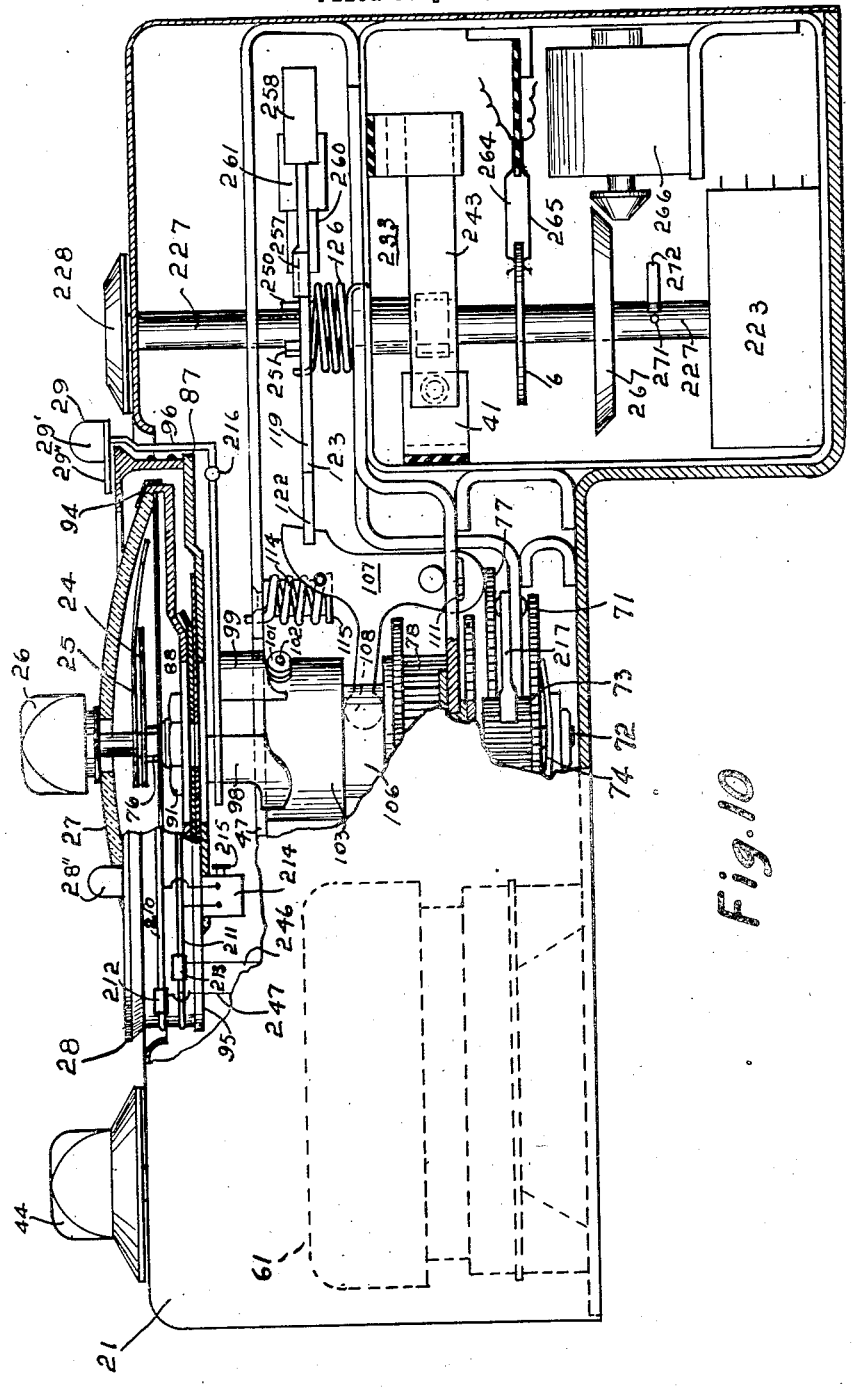

Feb. 18, 1947.                R. R. CANDOR                2,416,084
                           DOMESTIC APPLIANCE
                       Filed July 19, 1943          7 Sheets-Sheet 4
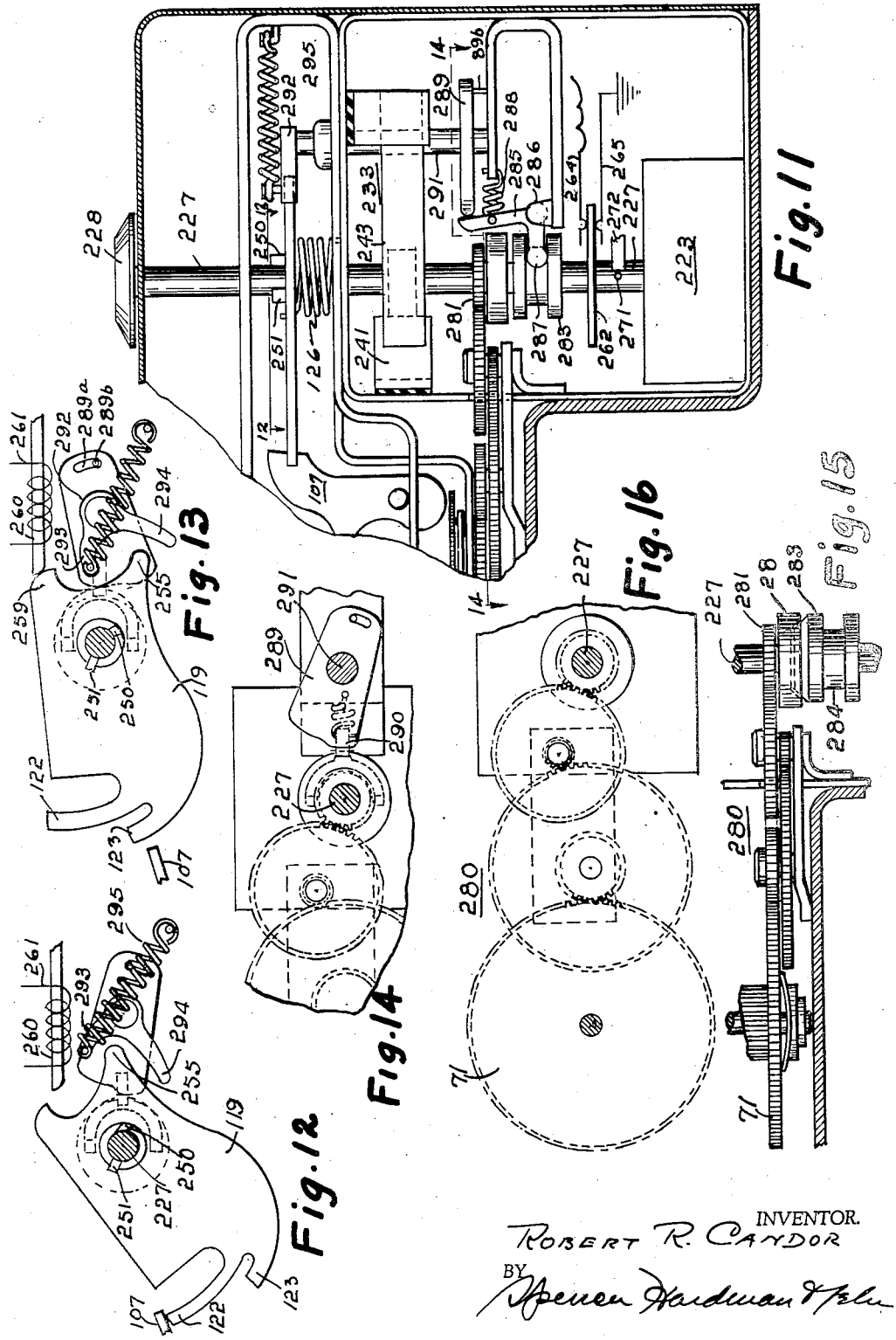
INVENTOR.
Robert R. Candor
BY Feb. 18, 1947. R. R. CANDOR 2,416,084
DOMESTIC APPLIANCE
Filed July 19, 1943 7 Sheets-Sheet 5

INVENTOR.
Robert R. Candor
BY
Spencer Hardman & Yeh

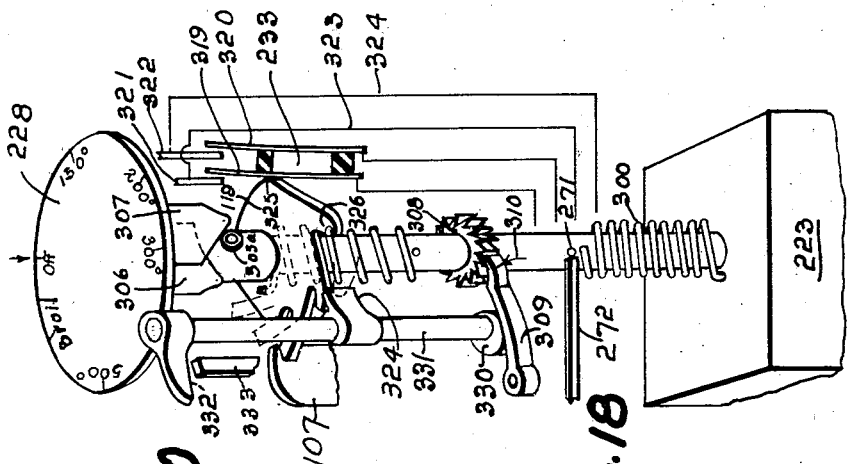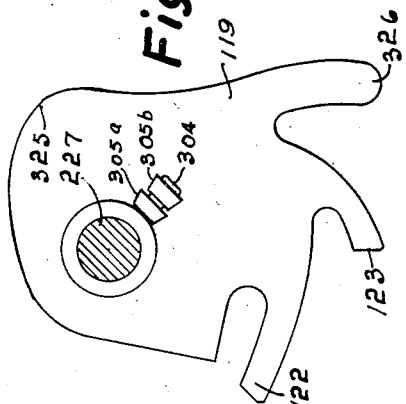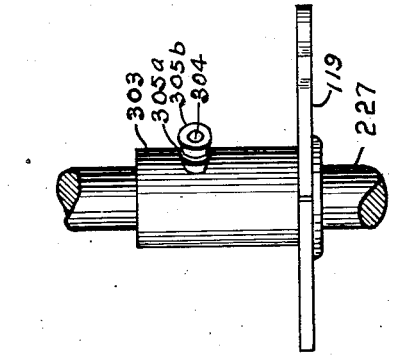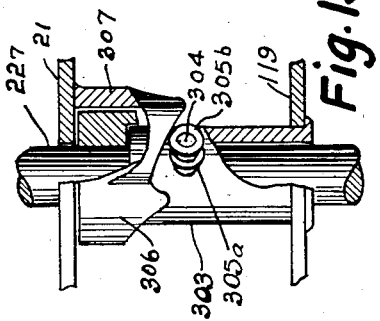

Feb. 18, 1947. R. R. CANDOR 2,416,084
DOMESTIC APPLIANCE
Filed July 19, 1943 7 Sheets-Sheet 7

INVENTOR.
ROBERT R. CANDOR
BY

Patented Feb. 18, 1947

2,416,084

UNITED STATES PATENT OFFICE 2,416,084

DOMESTIC APPLIANCE

Robert R. Candor, Oakwood, Ohio, assignor to General Motors Corporation, Dayton, Ohio, a corporation of Delaware Application July 19, 1943, Serial No. 495,293

19 Claims. (Cl. 219—20)

This invention relates to domestic appliances, and more particularly to automatic clock and thermostatic control of the heating means of a range or the like.

Heretofore electric and gas ranges have been provided with clock controls and thermostatic controls. In order to cause the clock control and thermostatic control to cooperate in the desired manner, it has been customary to provide an "off and set" knob or lever, the position of which determines whether the clock control shall or shall not dominate the thermostatic control. In addition, the clock control has been provided with an on time indicator and an off time indicator, while the oven thermostatic control has been provided with one or more knobs to select the desired temperature and otherwise to control the oven. Consequently, it has been necessary for the user to set: (a) a clock on time indicator; (b) a clock off time indicator; (c) an off and set clock lever; and (d) one or more knobs for the thermostatic control. As a consequence, in view of the numerous levers, knobs and indicators necessary to be set, the user has been apt to forget to set one of them, or to set one or more of them incorrectly, and thus fails to obtain the desired operation of the range.

For example, in the apparatus disclosed in the patent to Gallagher et al., 2,302,625, which is referred to merely by way of example, and which has been in extensive commercial use, the operator sets the on time indicator 29', the off time indicator 28", the off and set lever 33', the thermostat (Fig. 2 of said patent) and switch 155. This requires five knobs, levers or indicators to be set correctly in order to obtain proper combined clock and thermostatic control. The thermostat adjustment and switch 155 are quite frequent and familiar adjustments to the operator, and the on and off time indicators 29' and 28" are necessary to be set; but the off and set lever 33' is likely to be forgotten, and, if forgotten, will prevent the desired operation of the oven of the range.

This invention obviates the necessity of the off and set lever, or corresponding control, and requires the operator only to set the on and off time indicators and the thermostatic control in order to obtain correct operation of the range oven. Means have been provided to take the clock out of control automatically after it has controlled a cooking cycle. In addition means have been provided to return the thermostatic control to the off position at the termination of a clock controlled cooking cycle, in order to prevent cooking after the clock has passed the off time. However, means have been provided to prevent the clock from accidentally returning the thermostat control to the off position during a non-clock controlled cooking operation.

The invention has been disclosed as applied to a thermostatic control provided with a single knob; but many of the advantages of this invention may be obtained with the use of a multiple knob thermostatic control, such as one having a selector switch knob and a thermostatic knob. In this latter case the thermostat may be provided with an off position and temperature settings and may be controlled as herein disclosed, while the selector switch may be independently manually operated. It is also applicable to gas ranges as well as to electric ranges, as is readily apparent.

An object of this invention is to provide a clock control and a thermostatic control for the heating means of a range in such a manner that the setting of the on and off indicators of the clock, and the setting of the thermostat at a temperature position automatically places the heating means under the combined control of said clock and thermostat until the clock time reaches the off indicator time, at which time said clock is automatically taken out of control of the range until the indicators are reset.

Another object of this invention is to provide a combined clock thermostatic control such that it is only necessary to set the on and off indicators on said clock and the thermostatic control in order to place said clock automatically in combined control with said thermostat of the heating means on a range.

Another object of this invention is to provide a combined clock and thermostatic control such that it is only necessary to position on and off indicators on said clock and to adjust the thermostat to a selected temperature in order to place the combined clock and thermostat in control of the heating means of a range, during the period of time from the positioning of said indicators until the clock reaches the off indicator time, at which time the clock is automatically taken out of control until reset.

Further objects and advantages of the present invention will be apparent from the following description, reference being had to the accompanying drawings, wherein a preferred form of the present invention is clearly shown.

In the drawings:

Fig. 2 is a plan view of the clock switch means shown in Fig. 1, at the time of the setting of the controls assuming such time to be 1:15 and the thermostat to be set at 300°;

Fig. 3 is a view similar to Fig. 2, assuming the clock time to coincide with the on time (2 o'clock);

Fig. 4 is a view similar to Figs. 2 and 3, assuming the clock time to have reached the first instant of the off time (4 o'clock);

Fig. 5 is a view similar to Fig. 4, at a slight interval of time thereafter, when the thermostat manipulator has been automatically returned to the off position;

Fig. 6 is a view in perspective of a portion of the clock switch means surrounding the thermostat shaft;

Fig. 7 is a side view of the clock switch actuator means at the instant that the clock time reaches the on time (2 o'clock);

Fig. 8 is a side view of the clock switch actuator means at the instant that the clock time reaches the off time (4 o'clock);

Fig. 9 is a view at right angles to Fig. 8;

Fig. 10 is a vertical cross-sectional view (somewhat diagrammatic) of the control mechanism shown in Fig. 1;

Fig. 11 is a view of the right hand end of Fig. 10, but showing a clutch mechanism, powered from the clock motor, for returning the thermostat manipulator to the off position;

Fig. 12 is a horizontal cross-section of a portion of Fig. 11, taken along the line 12—12, assuming the time to be the time of setting the controls prior to the on time (1:15 o'clock);

Fig. 13 is a view similar to Fig. 12, when the clock time has reached the off time just before the thermostat manipulator is returned to the off position;

Fig. 14 is a horizontal cross-section taken along the line 14—14 of Fig. 11 at a time corresponding with Fig. 12;

Fig. 15 is a vertical view of the gear train from the clock to the clutch mechanism;

Fig. 16 is a horizontal view of Fig. 15;

Fig. 18 is a view of a portion of Fig. 17 showing a mechanical manual release for the spring means in lieu of a manual electrical release;

Fig. 19 is a vertical elevation, partly in cross-section, of a portion of the clock switch means shown in Figs. 17 and 18;

Fig. 20 is a top view of Fig. 19;

Fig. 21 is a view similar to Fig. 19, with certain portions removed;

Fig. 22 is a view of a portion of Fig. 19, with the clock switch means in a different position.

The improvements brought about by this invention have been shown in Figs. 1 through 16 as applied, for convenience, to a portion of the clock structure disclosed in the patent to W. P. Gallagher 2,301,942, granted November 17, 1942, entitled Timing mechanism. The numerals applied to the various elements in Figs. 1 through 16, which are below 200, are to be understood to be the same in structure and function, so far as possible, with the correspondingly numbered elements in said Gallagher Patent 2,301,942. Certain other improvements brought about by this invention, have been shown in Figs. 17 through 22 which utilize the clock and master switch construction of Figs. 1 through 16; but in which the thermostat is returned to the off position by spring power. In these latter modifications the thermostat has been indicated to be adjusted by turning in the opposite direction from that of Figs. 1 through 16. The action of plate 119 of Figs. 17 through 22 is more like that disclosed in the patent to W. P. Gallagher et al. 2,302,625, granted Nov. 17, 1942, for Electrical timing apparatus. The numerals applied to the various elements in Figs. 17 through 22, are to be understood to be the same in structure and function, so far as possible, with the correspondingly numbered elements in the previous description of Figs. 1 through 16. Detailed description of the elements disclosed in the said patents is not here repeated, and only such description of such elements is here given as may be necessary for the explanation of the improvements applied thereto reference being made to said patents for a fuller disclosure of them. The new elements or the old elements which have been radically modified, have been numbered with numerals over 200, in order to make it unnecessary to digress in the explanation each time that a new or old element is referred to or described. It is to be understood that all elements numbered below 200 are to have the structure and function, so far as may not be necessary to modify them, as in said patents, and that such elements are to cooperate with other necessary elements disclosed in said patents, which may or may not be disclosed in this application.

While I have shown the improvements of this invention to be applied to the structure of Patents 2,301,942 and 2,302,625, merely by way of example, it is to be understood that these improvements are applicable in any of the well known clock and thermostat constructions.

Figure 1:
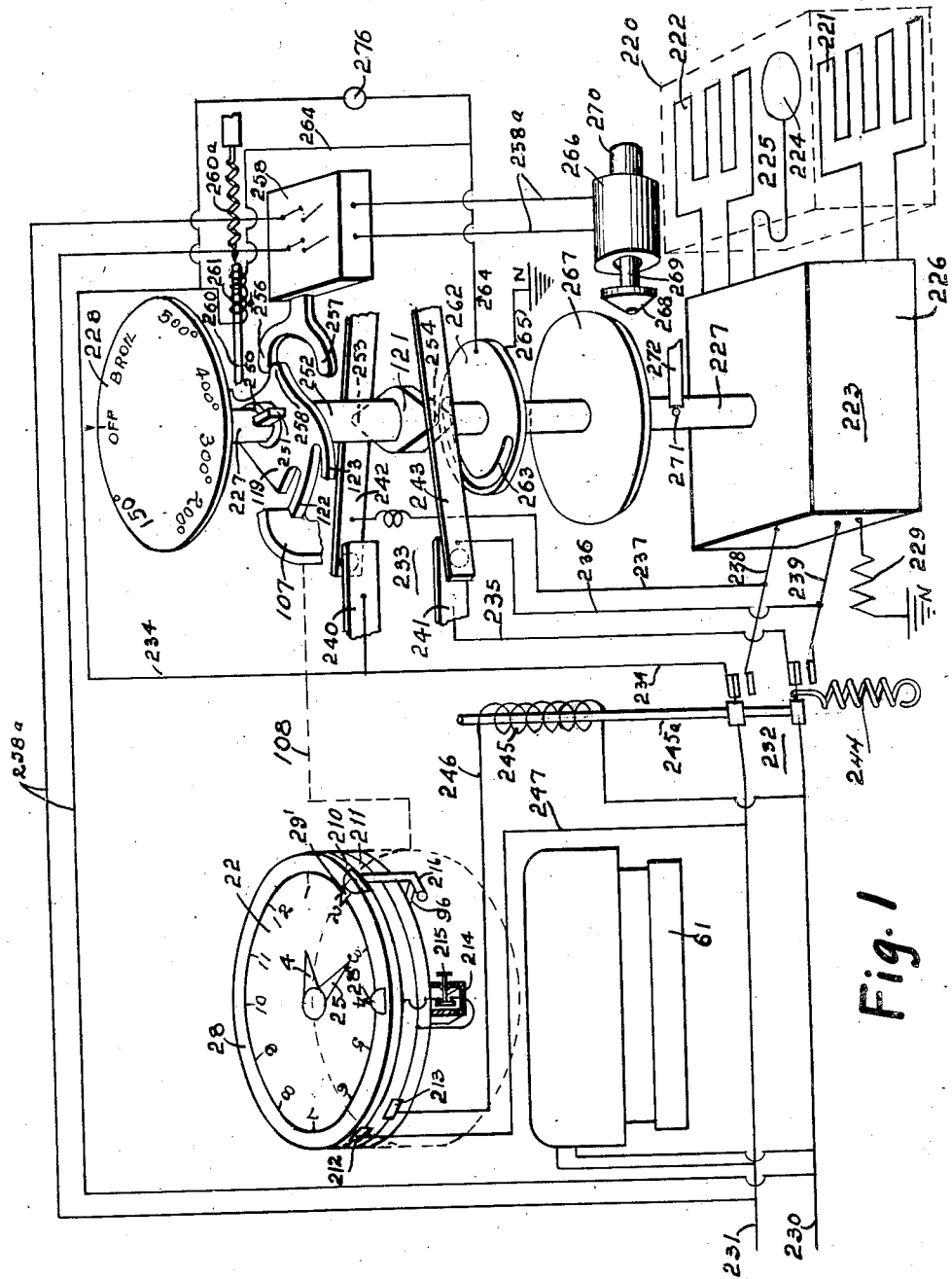
Fig. 1 is a diagrammatic representation of one embodiment of my invention.
Figure 17:
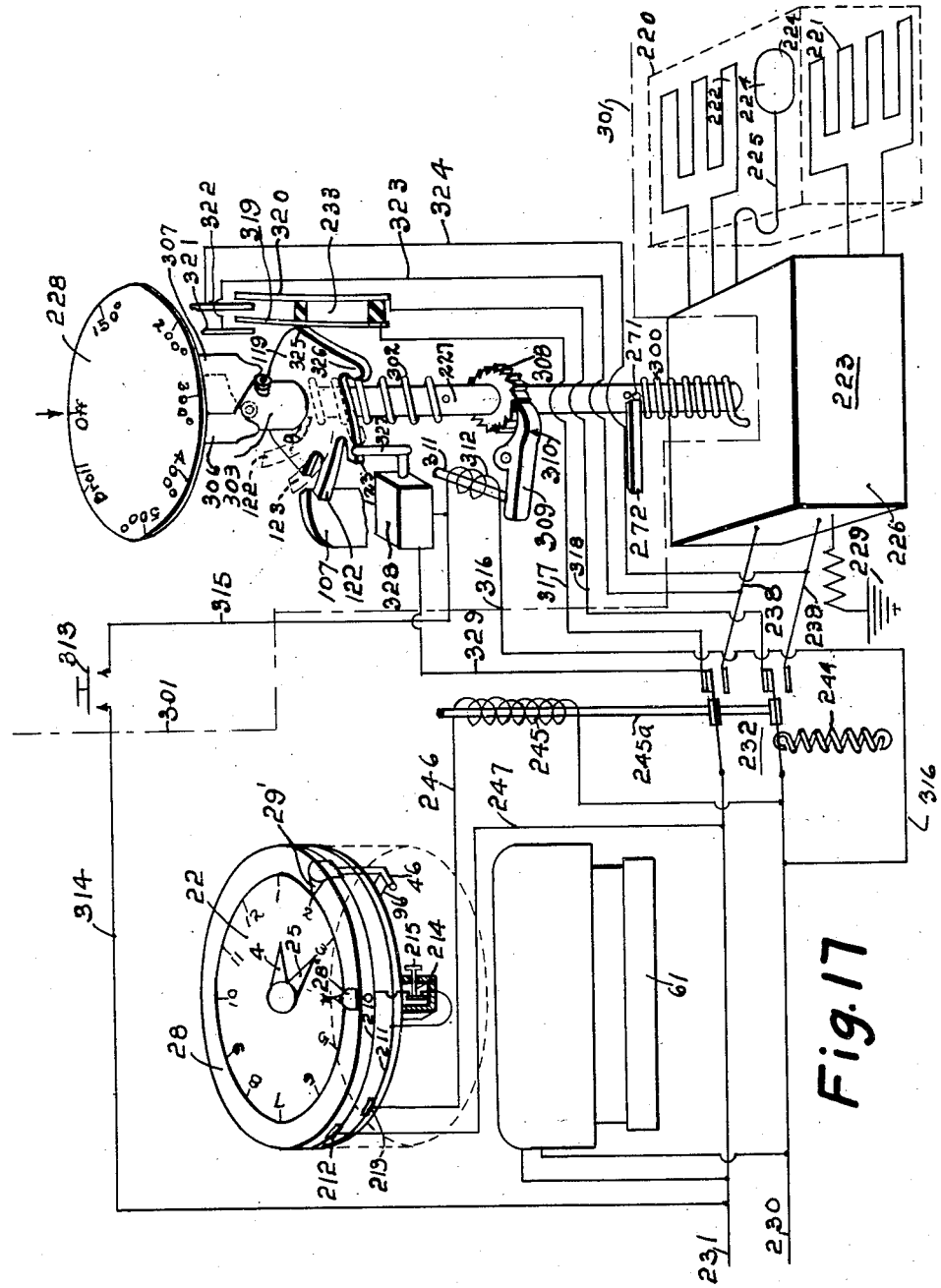
Fig. 17 is a diagrammatic view, somewhat similar to Fig. 1, showing spring powered means for returning the thermostat manipulator to the off position.

In Figs. 1 through 16, some of the parts of the clock mechanism in Gallagher Patent 2,301,942 have been slightly modified. The cooking ring 28 has been provided with electrical conducting track-ways 210 and 211, which are electrically insulated from the ring 28. A pair of stationary electrical wiping contacts 212 and 213 are in electrical contact with the track-ways 210 and 211. A push button switch 214 is carried by the ring 28 and has its terminals connected with the tracks 210 and 211 and is opened by the pressing in of the push button 215. The switch 214 is to be positioned circumferentially with respect to indicator 28'' so that it is actuated when the indicators 29' and 28'' are in substantial coincidence. In Figs. 1 and 17 switch 214 has been shown directly under indicator 28'', although in actual construction it may be slightly to the left. The ring 28 carries the off time indicator 28' or 28'' substantially as in said patent. The on time indicator 29 or 29' or 29'' is substantially the same as in said patent, and is carried by arm 96, which is provided with a finger 216 adapted to come in contact with the push button 215 when the indicators 29 and 28' are brought in substantial coincidence. The finger 216 has been shown extending, in exaggerated form, a substantial distance to the left of indicator 29', for convenience of disclosure. The circumferential relationship of finger 216 and button 215 is to be made such that the indicators 29' and 28'' are in the desired coincidence when the switch 214 is actuated. The on cam 99 has its lower end shaped as in Fig. 7, with a gradual sloping portion 99', which moves the roller 101 down to the locking abutment 99''.

This construction causes the shifter sleeve 103 to move downwardly substantially the same as in the Gallagher Patent 2,301,942; but adds the function that the roller 101 and stud 102 drive the arm 96 and on indicator 29', through the medium of abutment 99'', into substantial coincidence with the off indicator 28''. The off cam 98 is shaped as indicated in Fig. 8 and its lower end is sloped to a blunt apex 98' which extends below the level of the end of abutment 99''. The roller 201, which is also mounted on stud 102 rides along the bottom of the off cam 98 and further depresses the shifter sleeve 103 a sufficient distance to allow the roller 101 to ride under the abutment 99'' and thus permit the stud 102 to ride around without further driving the on indicator 29 or without moving the off indicator 28''; but leaves the indicators in substantial coincidence at the selected off time. When the cams 98 and 99 are in substantial coincidence, the finger 216 comes in contact with the push button 215 and opens the switch 214 for the purpose hereinafter to be more fully described. A pawl 217 has been added for the purpose of allowing the clock to be set in a clockwise direction; but preventing it from being set in an anti-clockwise direction, in order to prevent erroneous setting of the mechanism hereinafter to be described. The plate 119 has been modified in shape for a purpose hereinafter to be more fully apparent. In the modifications shown in Figs. 17 to 22, the clock construction, indicator, track-way, push button, finger and master switch construction are to be substantially the same as in the previous features. However, in the modifications of Figs. 17 through 22 the plate construction of 119 follows more closely the operation of the plate 119 of Gallagher et al. Patent 2,302,625 rather than the plate construction of 2,301,942 in that the plate 119 is normally at its clockwise terminus in the off position in Figs. 17 through 22, whereas it is at its counterclockwise terminus in Figs. 1 through 16. The difference in operation of the plate 119 in the various figures will become more readily apparent in the more detailed description to follow. The off and set levers or knobs 33' of said patents have been omitted, as they are unnecessary with this invention.

Referring now to the present invention, 220 indicates a space to be heated. This space may be the oven of an electric range or any other similar space. Heating means 221 and/or 222 may be provided for the space. A clock, having a dial 22, may be provided for controlling the heating means, and is driven by the motor 61 through gearing 71, 72, etc., as described in said patent. This clock may include an on time indicator 29', and an off indicator 28'', which may be moved by the operator to any selected on and off time indication. A thermostat 223 may be provided, which may be made responsive to temperature in the space or oven 220, for example, through the medium of a thermostatic fluid containing bulb 224 within the space and connected by a fluid medium conducting tube 225 to the main switch construction of the thermostat, which is contained in the box 226. The thermostat switch means in box 226, together with the tube 225 and bulb 224 may be of any construction, such as is now well known in the electric range oven art, and therefore is not shown in detail. This structure, as well-known, includes thermostatic switching means and a bellows or diaphragm in box 226 (not shown) responsive to power derived from the flow of fluid to and from the bulb 224. This turns the heaters 221 and 222 on and off in response to the temperature in the oven, so as to maintain a substantially constant selected temperature within the oven. The switching means and the bellows or diaphragm is capable of adjustment by the turning of shaft 227, in such a manner that, when the thermostat control manipulating means or knob 228 is in the off position, no electrical power can reach the heaters 221 and 222, regardless of the temperature in the oven. However, when the manipulator or knob 228 is turned to any selected temperature setting, such as 150° through 500°, then the switch construction in box 226 turns the heaters 221 and 222 on and off in response to fluid impulses from the bulb 224 to maintain the oven at substantially the temperature selected by the position of the manipulator 228. Preferably the construction is such that, when the manipulator 228 is turned to the broil position, then only the upper heater 222 is energized; but at any other temperature setting, such as between 150° through 500° the lower heater 221 is energized at full wattage and the upper heater 222 is energized at reduced wattage for baking. To obtain the reduced wattage, one terminal of heater 222 is connected, through a resistance 229, with the neutral line N of the power source. Also, if desired, the thermostat construction may be such that when the knob 228 is first turned to broil and then to a lower temperature setting both heaters 221 and 222 are energized at full wattage until the selected temperature is reached, after which the heaters are turned on and off with the upper heater 222 at reduced wattage and the lower heater 221 at full wattage. This "preheat" cycle is not ordinarily used when the clock control is being utilized. Such a thermostat construction has been used commerically on ranges manufactured and sold in this country, and is, per se, well known. A disclosure of the principles of operation is to be found in the application of Francis H. McCormick S. N. 232,592, filed Sept. 30, 1938, or the application of Victor Webber, S. N. 323,162, filed March 9, 1940.

A source of power may be provided, such as two or more power lines 230 and 231. The power lines 230 and 231 are connected to a master switch 232. When the indicators 29' and 28'' are positioned to different on and off times, the master switch 232 connects the power lines 230 and 231 to the clock switch means 233 through the lines 234 and 235 and from thence to the thermostat 223, through the lines 236 through 239. When the indicators 29' and 28'' are brought together, the power lines 230 and 231 are connected directly to the thermostat by the master switch 232 and lines 238 and 239 as hereinafter more fully explained.

The clock 22 automatically releases the clock switch plate 119 when the clock hand 24 coincides with the on and off positions (in a manner disclosed in said Gallagher Patent 2,301,942) to close the clock switch means 233 at the on time and to maintain it open previous to the on time. Contacts 240 and 241 of the switch means 233 are connectible to the power source 230 and 231 through the medium of master switch 232 and lines 234 and 235. The other contacts 242 and 243 of the switch means 233 are connected to the thermostat 223 through the medium of lines 236 through 239.

Means are provided for automatically placing the clock in control of the thermostat 223 when the indicators 29' and 28" are positioned to different on and off times, and for automatically connecting the thermostat 223 directly to the power lines 230 and 231 when the indicators 29' and 28" are brought into substantial coincidence. To this end, the master switch 232 is biased in the down position by the spring 244 and is pulled to the upper position by the solenoid 245. The solenoid 245 is energized whenever the indicators 29' and 28" are spread apart, and is deenergized whenever the indicators are brought together as hereinafter more fully explained. Thus whenever the indicators 29' and 28" are spread apart, the power is routed from power lines 230 and 231 through the master switch 232, lines 234 and 235, contacts 240 through 243 and lines 236 through 239 to the thermostat 223. The thermostat 223, in turn, controls the flow of power to the heaters 221 and 222 in accordance with the setting of the manipulator 228. When the indicators 29' and 28" are brought together, the master switch 232 moves to its lower position, so that power from the source 230 and 231 flows directly through the master switch 232 and lines 238 and 239 to the thermostat 223 without passing through the clock switch means 233. This enables the operator to use the thermostat 223, without the clock control, merely by leaving the indicators 29' and 28" together; or the operator may use the clock control in combination with the thermostat by placing indicators 29' and 28" at different on and off times and by adjusting the thermostat knob 228 to a selected temperature.

Control of master switch 232 by the position of indicators 29' and 28" preferably is accomplished by an electric circuit which includes the stationary wiping contacts 212 and 213, which ride upon the movable tracks 210 and 211, respectively, carried by the movable ring 28, on which the off indicator 29" is secured. The ring 28 also carries the push button switch 214, which is spring-pressed in closed position, but is opened by the pushing in of button 215. The on indicator 29' is carried by an arm 96 and is provided with a finger 216 which pushes against the button 215 when the indicators 29' and 28" are brought into substantial coincidence. (By "coincidence" is meant positions as close to each other as is desired or construction will allow.) One of the stationary wiping contacts 213 is connected by the line 246 to the solenoid 245, which in turn is connected to one of the power lines 230. The other wiping contact 212 is connected to the other power line 231 by line 247. Therefore, whenever the switch 214 is in closed position, the solenoid 245 is energized, and when the switch 214 is in open position, the solenoid 245 is deenergized. The solenoid 245 operates the switch 232 through plunger 245a. Since the switch 214 is closed whenever the indicators 29' and 28" are spread apart, and the switch 214 is open when they are together or in substantial coincidence, the solenoid 245 is energized when the indicators are spread apart to raise the switch 232 to its upper position, and the solenoid 245 is deenergized when the indicators 29' and 28" are together or in substantial coincidence to allow the switch 232 to spring to its lower position. Accordingly, the power flows from 230 and 231 through switches 232 and 233 and thermostat 223 to the heaters 221 and 222 when the indicators 29' and 28" are spread apart, and the manipulator 228 is positioned at some temperature setting. On the other hand, power flows directly from power lines 230 and 231 through the switch 232, lines 238 and 239 and thermostat 223 to the heaters 221 and 222 (without passing through switch 233) when the indicators 29' and 28" are together. The operator, therefore, may control the heating of oven 220 by combined clock and thermostat control by setting the on and off time indicators 29' and 28" and the thermostat knob 228; or the operator may control the heating of the oven 220 by the thermostat alone by setting the thermostat knob 228 and leaving the indicators 29' and 28" in coincidence.

The solenoid 245 and master switch 232 may constitute a unitary relay which may be located at any convenient place on the range. It may be located inside the casing 21, or it may be mounted within the range at any desired location.

The plate 119 and the switch cam 121 of Gallagher 2,301,942 have been modified when used in this invention according to Figs. 1 through 10 in the following manner. The switch plate 119 is provided with an upwardly extending lug 250 with which the lug 251 cooperates. The lug 251 is secured to the shaft 227 and is used to rewind the plate 119 when the thermostat knob 228 is turned from some temperature setting to the off position. The plate 119 also has the switch cam 121 attached to it by the sleeve 252. The cam 121 is provided with cam lobes 253 and 254 which are so located that, when the stop shoulder 122 is held by the lever 107, the lobes 253 and 254 hold the movable contacts 242 and 243 away from the stationary contacts 240 and 241. When the stop 123 is against the lever 107, then the lobes 253 and 254 move away from the movable contacts 242 and 243 and allow them to come into contact with the stationary contacts 240 and 241. The plate 119 is also provided with a lobe 255 which moves the off arm 256 and the on arm 257 of a snap switch 258 for a purpose hereinafter to be more fully explained. The plate 119 is also provided with another lobe 259 which cooperates with the solenoid plunger 260, so that the plunger 260 may hold the plate 119 in its wound counterclockwise position at certain times when the lever 107 is retracted, as more fully hereinafter to be described. The solenoid plunger 260 is spring-pressed to the left by spring 260a, and is retracted by the solenoid 261 whenever the solenoid is energized.

The shaft 227 carries a contact disc 262 which is made of insulating material and carries the conducting arc 263 in such a position that the arc 263 bridges the lines 264 and 265 when the knob 228 is at a temperature setting, such as from 150° through 500°. The purpose of solenoid plunger 260, as will be hereinafter more apparent, is to hold the plate 119 in its wound position, when the solenoid 261 is deenergized, in order to prevent the plate 119 from unwinding and causing the thermostat knob 228 to be returned to the off position at an undesired time. The master switch 232 and the arc 263 determine the conditions under which the solenoid plunger 260 may be or may not be retracted.

Means are provided for automatically returning or positioning the thermostat control manipulating means or knob 228 to the off position when the clock on and off indicators 29' and 28" are brought together by the clock. To this end, a motor 266 is provided which is automatically energized by the snap switch 258, through lines 258a, when the clock and the on indicator reach the off time (4 o'clock). The motor 266 is then geared to the shaft 227 to drive the shaft 227 counterclockwise back to the off position of knob 228. Any suitable arrangement for gearing the motor 266 to the shaft 227 may be used. Merely by way of example, a beveled gear, or friction disc, 267 may be keyed to the shaft 227, and a beveled gear, or friction disc, 268 may be secured to the armature shaft 269 of the motor 266. The armature of the motor 266 may be slightly longitudinally biased to the right, as diagrammatically indicated at 270, so that when the motor 266 is deenergized the shaft 259 automatically biases to the right; but when the motor 266 is energized then the armature 270 is magnetically pulled to the left, causing the beveled gear 268 to come in contact with the gear 267 and to drive the shaft 227 counterclockwise. As will be hereinafter more fully described, the motor 266 returns the shaft 227 and knob 228 from any temperature setting back to the off position whenever the indicators 29' and 28" are brought together to cause the plate 119 to unwind. The shaft 227 is provided with a lug 271 which comes in contact with the abutment 272 when the knob 228 reaches the off position and prevents the movement of shaft 227 counterclockwise beyond the off position. The motor 266 may be permanently geared to shaft 227, if it is desired to omit the automatic clutch action of discs 267 and 268. The motor then will be turned at all times that the knob 228 is turned.

The operation of the modification shown in Figs. 1 to 10 is as follows:

Assume that the clock time is 1:15, and that the operator wishes the oven to start to bake at two o'clock and to stop baking at four o'clock, at a temperature of 300°. Fig. 1 indicates these conditions, except that the knob 228 has not yet been turned to 300°. When the user places the on indicator 29' at two o'clock and the off indicator 28" at four o'clock, and moves the thermostat knob 288 to 300°, the position of plate 119, arm 107 and associated parts assume the positions indicated in Fig. 2. The solenoid arm 260 is retracted because the master switch 232 was raised to its upper position by the separation of the indicators 29' and 28". This energized the line 234, which carried electrical power to the solenoid 260, and from thence through the line 264, arc 263 and line 265 to the neutral or ground line, thus completing an electrical circuit through solenoid 261. At this time (Fig. 2) the lobes 253 and 254 maintain the contacts of switch 233 in open position, thus preventing electrical power from reaching the heaters 221 and 222, the electrical circuit thereto being broken at switch 233.

At the on time, which is assumed to be two o'clock, the plate 119 assumes the position shown in Fig. 3. This is accomplished because the roller 101 has come in contact with cam 99 and has reached the position indicated in Fig. 7, so that the cam 99 has depressed the stud 102 and shifter sleeve 103, thus rocking the arm 107 to the position indicated in Fig. 3 through the medium of arm or lobe 108, shown in Fig. 10 and diagrammatically indicated by the dotted line 108 in Fig. 1. The movement of lever 107 to the position shown in Fig. 3 allows the plate 119 to unwind clockwise, under the tension of spring 126, so that the arm 123 comes in contact with lever 107. This closes switch 233 and allows electrical energy to flow from the power source 230, 231, through switches 232 and 233 to the thermostat 223. Since the oven is assumed to be cold at this time, the thermostat switch construction in box 226 will be closed by the action of bulb 224 and will allow electrical energy to flow to the heaters 221 and 222. These heaters quickly raise the temperature of the oven to 300°, at which time the fluid flow from the bulb 224, acting on the bellows and switch construction in box 226, opens that switch construction in box 226 and deenergizes the heaters until the temperature in the oven 220 falls a slight amount below 300°. At this time, the switch construction in 226 due to the return of fluid to bulb 224 (as is well understood) again energizes the heaters 221 and 222. This turning on and off of the heaters continues from shortly after two o'clock until four o'clock.

At the first instant of the off time, which is assumed to be four o'clock, the plate 119 assumes the position shown in Fig. 4, by reason of the fact that the lever 107 is retracted through the action of cam 98 and roller 201, which acts on the shifter sleeve 103 and arm or lobe 108 to rock the lever 107 to the position shown in Fig. 4. In addition, when the indicator 29' comes into substantial coincidence with the indicator 28" at four o'clock, the finger 216 contacts the push button 215 and allows the switch 232 to assume its lower position. This deenergizes the solenoid 261 and allows the plunger 260 to be spring-pressed to the left. The lobe 255 strikes the on arm 257 of the snap switch 258 and closes the switch 258 to energize the motor 266. The motor then turns the shaft 227 counterclockwise so that the shaft 227, acting through lugs 251 and 250, winds the plate against the action of spring 126 to the position shown in Fig. 5. The plunger 260 has snapped over the lobe 259 and locked the plate 119 in the position shown in Fig. 5. The lobe 255 has struck the off arm 256 of the snap switch 258 and has deenergized the motor 266 just as the knob 228 reaches the off position.

When the various controls reach the position indicated in Fig. 5, the power source 230, 231 is connected directly to the thermostat 223 through the lower position of master switch 232. The circuit then has been placed in a condition such that the heaters 221 and 222 cannot be energized because the switch construction in box 226 is opened whenever the knob 228 is in the off position. This therefore breaks the electrical circuit from 230 and 231 at 226. The arrangement is then in such a condition that, if desired, the user can turn the oven on to any heating condition desired independently of the clock merely by turning the knob 228 and leaving the on and off indicators in coincidence (both at four o'clock or any other coincidental position); or, if desired, the user can again place the oven under the combined control of the clock and the thermostat by setting the on and off indicators 29' and 28" at separated times and by adjusting the knob 228 to some temperature position.

When the user wishes to operate the oven 220 without clock control he turns the knob 228 from the off position to some other desired position without separating the indicators 29' and 28". Even if the clock time should cross the position of the indicators 29' and 28" (when they are in coincidence), this will not affect the setting of the knob 228 because the motor 266 cannot return the knob 228 to the off position. The reason for this is that the solenoid 261 cannot be energized when the switch 232 is in its lower position (as it is when the indicators 29' and 28" are in coincidence). The solenoid plunger 260 therefore holds the plate 119 in the position shown in Fig. 5, under these conditions, even though the cam 98 does cause the shifter sleeve 103 to rock the lever 107 away from the plate 119 to the position shown in Fig. 5. The motor snap switch 258 therefore remains open and the motor 266 does not return the knob 228 to the off position. Therefore the user may operate the oven under the control of knob 228, independently of the clock, so long as the user does not spread the indicators 29' and 28" apart.

If desired, a lamp 276 may be provided to be energized only when the operator has properly placed the on and off indicators 29' and 28" in spread apart condition and has turned the knob 228 away from the off position to some position between 150° through 500°. In other words, the lamp 276 is energized only when the user has properly set the controls so that the clock will cooperate with the thermostat to energize the oven under baking conditions for a selected period of time. The lamp 276 can only be energized when the switch 232 is in its proper position (when the indicators 29' and 28" are spread apart) and when the disc 262 has been turned so that the arc 263 bridges the lines 264 and 265 (when the knob 228 is between 150° through 500°). Therefore, when the user wishes to set the controls to turn on the oven at some future time under proper clock and thermostat control, he will be assured that all necessary knobs have been adjusted when the lamp 276 is energized.

The modification shown in Figs. 11 through 16 is substantially the same as that heretofore disclosed with regard to Figs. 1 through 10, except that, in Figs. 11 through 16, the thermostat knob 228, and shaft 227, are returned to the off position by the clock motor 61 instead of by the additional motor 266. It is to be understood that the undrawn portion of the apparatus shown in Figs. 11 through 16 is to be the same as that disclosed in Figs. 1 through 10.

The knob 228, and shaft 227, in Figs. 11 through 16 is geared to the motor 61 (of Figs. 1 and 10) through the means of gear train 280, which is connected at one end to the clock motor gear 71, and at the other end to the clutch driving gear 281. Any suitable ratio of gear drive may be used, which will drive the shaft 227 reasonably fast and in a counterclockwise direction. The gear 281 is keyed to the driving clutch member 282, which is rotatable independently of shaft 227. The driven clutch member 283 is axially slidable on, but rotationally keyed to, the shaft 227, and is provided with an annular groove 284. A bell crank 285 is fulcrumed at 286 and has a rounded knob 287 in the annular groove 284. A spring 288 pulls on the bell crank 285 normally to bias the driven clutch member 283 in its upper position. The upper arm of the bell crank 285 is actuated by a cam 289, which has a protuberance 290. The cam 289 is keyed to the shaft 291, to the upper end of which is secured a fixture 292 having an off arm 293 and an on arm 294, which have the same ultimate function as the off and on arms 256 and 257 in Figs. 1 to 10. That is, when the lobe 255 of the plate 119 strikes the off arm 293 as indicated in Fig. 12, the fixture 292 snaps, by the action of snap-spring 295, to the off position and disengages the clock 61 from the shaft 227 and stops rotation of knob 228. This is accomplished because the fixture 292, when in its position in Fig. 12 carries the cam 289 to the position shown in Fig. 14. This rocks the bell crank 285 counterclockwise and lowers the driven clutch member 283 away from the driving clutch member 282 to disengage the clutch. On the other hand, when the lobe 255 of plate 119 strikes the on arm 294, as shown in Fig. 13, the fixture 292 and cam 289 rock counterclockwise to move the protuberance 290 away from the bell crank 285, thus allowing the spring 288 to rock the bell crank 285 clockwise and bring the driven clutch member 283 into contact with the driving member 282. Rocking of cam 289 is limited by slot 289a and pin 289b.

From the foregoing description it is apparent that the user of the modification shown in Figs. 11 through 16 may set the clock indicators 29' and 28" (as in Fig. 1) and may set the knob 228 at some selected temperature, such as 300, with all of the members acting exactly as previously described with respect to Figs. 1 through 10. When so set, some of the parts assume the positions shown in Fig. 12, which corresponds to Fig. 2, and at this time the clock motor 61 cannot drive the shaft 227, and the oven is not heated because the switch 233 is open. At two o'clock (the on time) the plate 119 and lobe 255 move slightly, but do not actuate the arm 294 at all, or sufficiently to snap the fixture 292 to the on position. The switch 233 is closed by this movement of plate 119, however, as previously described with regard to Figs. 1 to 10, to allow the thermostat 223 to heat and control the oven until four o'clock. At four o'clock the plate 119 moves and assumes the position shown in Fig. 13, at which time the lobe 255 has struck and moved the on arm 294 sufficiently to snap the fixture 292 to the on position. This engages the clutch members 282 and 283 and causes the clock motor 61 to drive the shaft 227 and knob 228 to the off position through the medium of gear train 280, and clutch members 282 and 283. As the shaft 227 is moved counterclockwise the lug 251 engages the lug 250 and winds the plate 119 counterclockwise until the lobe 255 strikes the off arm 293 and disconnects the clutch 283, 284 at the time when the knob 228 reaches the off position. All of the other parts whether shown or not shown in Figs. 11 through 16 operate the same as previously described with regard to Figs. 1 through 10.

In the modifications shown in Figs. 17 through 22, the knob 228, and shaft 227 are returned to the off position by the spring 300 instead of by motor power. In these modifications, the knob 228 is turned counterclockwise from the off position to the temperature positions and is returned clockwise, which is the opposite to the action described with regard to Figs. 1 through 16. The thermostat 223 is the same as previously described, except that it is to be adjusted by rotation in the opposite direction. The clock 22, and all of the other parts to the left and below the dotted line 301, operate exactly as previously described with regard to Figs. 1 through 16, and their description is therefore not repeated, although corresponding parts are correspondingly numbered. The shaft 227 is biased clockwise by the spring 300 which is attached at one end to the shaft 227 and, at the other end, to any stationary support, such as box 226. It is also provided with a stop lug 271 which strikes against the abutment 272 when knob 228 reaches the off position. A spring 302 is secured at its lower end to the shaft 227 and at its upper end to the plate 119 and imparts a clockwise bias to the plate 119. The plate 119 is mounted on a sleeve 303 which is both axially and rotatably slidable on shaft 227. The sleeve 303 is provided with a stud 304 and two rollers 305a and 305b having substantially the same type of action as stud 102 and rollers 101 and 201 in Figs. 7 to 9. The knob 228 and shaft 227 have a cam 306 fixed thereto, which has substantially the same type of action with respect to roller 305a as cam 99 shown in Fig. 7. A stationary cam 307 supported independently of shaft 227, is mounted to be engaged by the roller 305b, substantially the same as cam 98 in Fig. 8. This construction is such that, as the knob 228 is turned counterclockwise from the off position, the cam 306 engages the roller 305a, as indicated in Fig. 22, and carries it to the position shown in Fig. 19, by the time that the knob 228 reaches the 150° position. In Figs. 17, 18 and 19, the plate 119 and rollers 305a and 305b are shown after they have been wound counterclockwise by the partial turning of the knob 228 to the 150° position. However, the knob 228 and cam 306 has then been returned to the off position (by a means hereinafter to be described) thus leaving the plate 119 held by the lever 107. When the user decides to turn the knob 228 again to any temperature position, the cam 306 can ride over the rollers 305a and 305b, as is apparent from Fig. 19, and allows the knob 228 to be turned to any desired position without turning the plate 119 beyond the position shown in Figs. 17 and 18. It is to be understood that the user may turn the knob 228 from the off position to any temperature position without returning the knob to the off position. The drawings Figs. 17, 18 and 19 have merely been drawn with the knob returned to the off position for convenience in disclosure. Normally the plate 119 is in the dotted line position when the knob 228 is at the off position.

The shaft 227 is provided with a ratchet 308 which is engaged by a pawl 309, normally counterclockwise biased by the spring indicated by the arrow 310. The pawl 309 may be turned clockwise to release the ratchet 308 and shaft 227 by the solenoid plunger 311 under the action of solenoid 312 which is controlled by the push button switch 313, a circuit being formed from power lines 230 and 231 through lines 314, 315, solenoid 312 and line 316 whenever the push button is depressed. Whenever the push button 313 is depressed the pawl 309 is taken out of engagement with the ratchet 308 and the knob 228 is driven to the off position by the action of spring 300. Thus the user can change the position of knob 228 clockwise whenever desired merely by depressing switch 313, as has been illustrated in Figs. 17, 18 and 19.

The master switch 232, in Fig. 17 operates as previously described. When in its upper position, the switch 232 energizes the lines 317 and 318 which lead to the clock switch 233 having movable contacts 319 and 320. The stationary contacts 321 and 322 are connected by lines 323 and 324 to the lines 238 and 239 leading to the thermostat 223. Therefore, whenever the switch 232 is in its upper position and the clock switch 233 is closed, the power lines 230 and 231 are connected to the thermostat 223 through the clock switch 233. In the off position of the knob 228, and up to any position near 150°, the switch in box 226 is open (as is well known) and prevents either of the heaters 221 or 222 from being energized regardless of the position of switches 232 or 233. When the pointers 29' and 28'' are spread apart to raise the switch 232, and when the knob 228 is moved to some temperature position, such as 300°, the plate 119 assumes the position shown in Fig. 17, so that the lobe 325 opens the clock switch 233. When the clock time coincides to the on indicator (at two o'clock), the lever 107 is moved to allow the arm 122 to pass, but arrest the arm 123. This moves the lobe 325 away from the contacts 319 and 320 and allows them to close the contacts 321 and 322. Electrical power then can flow from 230, 231, through the upper position of switch 232 and the clock switch 233 to the thermostat 223 and from thence to the heaters 221 and 222. The thermostat then controls the operation of the heaters to maintain substantially 300° in the oven until four o'clock, when the indicators 29' and 28'' are automatically carried into coincidence. This first moves the lever 107 to release the arm 123 and thereafter opens switch 214 to allow the switch 232 to assume its lower position. The relative position of cams 99 and switch 214 is shifted a slight degree in the modifications of Figs. 17 through 22, so that the switch 214 opens after the lever 107 has released arm 123. Therefore the first action (movement of lever 107) occurring at four o'clock releases the arm 123 so that lobe 326 strikes push button 327 of push button switch 328. Switch 328 is normally open and is closed only when push button 328 is pushed inwardly. When lobe 326 impacts on button 327 the switch 328 energizes the solenoid 312 through lines 329 and 316. This releases the pawl 309 and ratchet 308 and allows the spring 300 to return the knob 228 to the off position. Thereafter the switch 214 is opened by finger 216 and allows the master switch 232 to assume its lower position, to connect the thermostat 223 directly to the lines 230 and 231.

The operation of the modification shown in Fig. 17 is as follows: Assume that the user, at 1:15 o'clock, wishes to have a baking operation, regulated at 300°, start at two o'clock and stop at four o'clock. Under these conditions the user places the off indicator 28'' at four o'clock and the on indicator 29' at two o'clock. He also adjusts the knob 228 from the off position to 300°. This causes the master switch 232 to assume its upper position, and causes the plate 119 to rotate counterclockwise from the dotted line position to the full line position. In turning the knob 228 from the off position, the abutment 306a engages the roller 305a and rotates the plate 119 counterclockwise. As the turning progresses, the other roller 305b engages the lower sloping edge 307a of cam 307, thus lowering sleeve 303 and plate 119 until the apex 306b rides over its roller 305a. At this time the plate 119 is locked by the lever 107 while the shaft 227 may be further rotated to a selected temperature. (When the shaft 227 is returned, the sloping edge 306c allows the cam 306 to ride over the roller 305a.) It also adjusts the thermostat 223 to maintain a 300° temperature in the oven 220. At two o'clock the lever 107 is moved slightly to allow the arm 122 to pass, but remains in the way of arm 123, so that the plate 119 is rotated slightly in a clockwise direction. This moves the lobe 325 away from the switch 233 to close the same and allows current to flow from the power lines 230, 231, through switches 232 and 233 to the thermostat 223 and from thence to the heaters 221 and 222. The thermostat 223 cycles the heaters 221 and 222, in response to temperature in the oven 220 to maintain the same at 300° from two o'clock until four o'clock. At four o'clock the pointers 29' and 28'' have been brought automatically into substantial coincidence. The lever 107 is then first moved to release the arm 123 and allow the plate 119 to rotate and bring the lobe 326 into contact with the push button 327. This produces an electric circuit through solenoid 312, pulling pawl 309 and releasing ratchet 308 to allow the spring 300 to drive the knob 228 back to the off position. A few moments thereafter the finger 216 engages push button 215. This deenergizes the solenoid 245 and allows the switch 232 to assume its lower position, thus connecting the thermostat 223 directly with the power lines 230 and 231 (without passing through switch 233). Thereafter the user is free to adjust the thermostat knob 228 independently of the clock control if desired.

Should the user change his mind after having set the knob 228, he merely pushes down on push button 313 to create an electric circuit through the solenoid 312. This causes the pawl 309 to disengage from the ratchet 308 and allow the knob 228 to return to the off position.

In Fig. 18, the action of all of the parts is exactly the same as in Fig. 17, except that the pawl 309 is mechanically actuated by a cam 330 carried on a shaft 331 having a lever 332 at its upper end. The user can release the ratchet 308 merely by moving lever 332 counterclockwise against the stop 333. At four o'clock, the lobe 326 impinges on the lever 334, carried by the shaft 331 instead of against the push button switch of Fig. 17. The lever 334 rocks the shaft 331 to release the ratchet 308 in the same manner that the switch 328 accomplishes it electrically in Fig. 17.

The operation of the modification shown in Fig. 18 is the same as the operation heretofore described for the modification of Fig. 17, except that, instead of pushing down on button 313 of Fig. 17, the user rotates the lever 332 against the stop 333, whenever the user wishes to return the knob 228 to the off position. Also, when it is four o'clock, the plate 119 rotates to bring the lobe 326 into contact with the lever 334, to rotate the shaft 331 and cam 330 to release the ratchet 308 and allow the spring 300 to drive the knob 228 to the off position.

Figure 23:
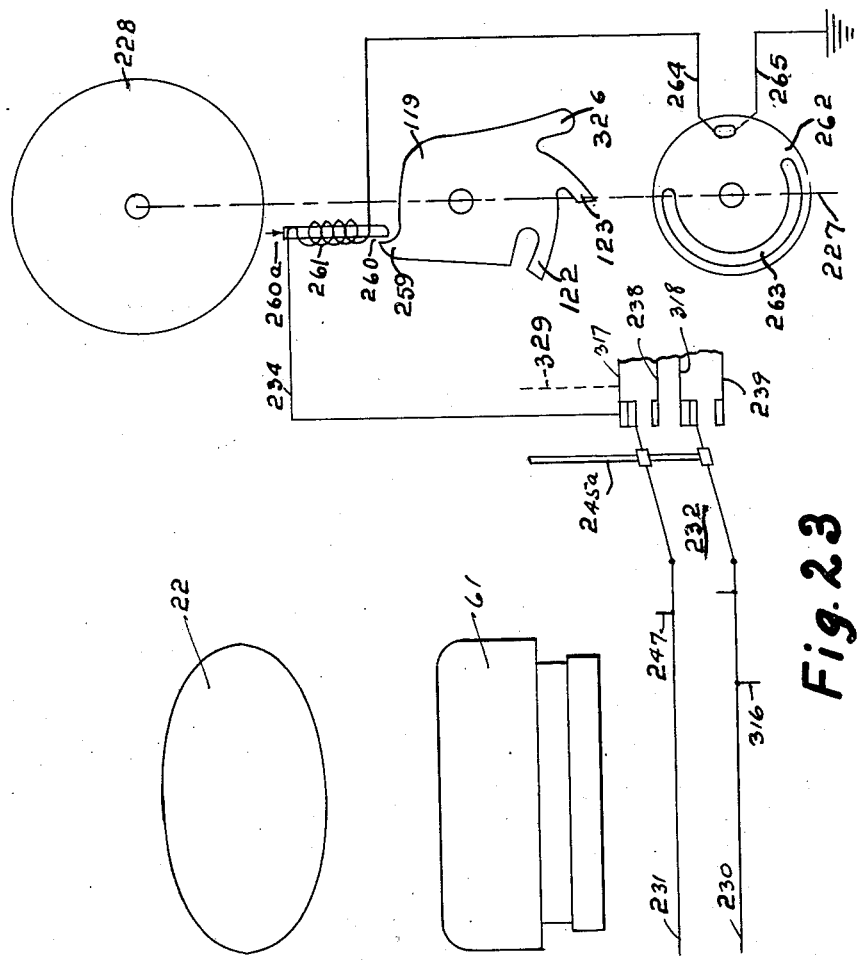
Fig. 23 shows an addition to Figs. 17 through 22.

Fig. 23 shows the addition of the solenoid lock construction 260, 260a and 261 and lobe 259 added to the plate 119 of Figs. 17 through 22. Under some conditions it is desirable to add this solenoid construction to the plate 119 of Figs. 17 through 22 for the purpose of preventing the plate from being accidentally tripped by the clock at an undesirable time. The plate 119 of Figs. 17 to 22 inclusive may have a lobe 259 added, together with the solenoid construction 260, 260a and 261. The shaft 227 may be provided with a contact disc 262, as previously described with regard to Figs. 1 to 16 inclusive. An electric circuit may be provided for the solenoid 261 leading from an upper stationary contact of switch 232 through line 234, solenoid 260, line 264, arc 263 and line 265 to the neutral or ground line, thus completing an electrical circuit through solenoid 261. The remainder of the electric circuit is the same as that shown in Figs. 17 or 18. The solenoid plunger 260 is spring-pressed in the same manner as the plunger described with regard to Figs. 1 to 16 inclusive. The solenoid 261 can only be energized to retract the plunger 260 when the clock on and off indicators 29' and 28'' are spread apart (to raise switch 232), and when knob 228 is set at some temperature position (to cause arc 263 to bridge lines 264 and 265). The plunger 260 thus maintains the plate 119 in wound, counterclockwise position even if the clock time should cross the on and off indicators when they are not spread apart. The action of solenoid 260, 260a and 261, and lobe 259 is thus the same in Figs. 17 to 23 inclusive as it is in Figs. 1 to 16 inclusive.

While the form of embodiment of the invention as herein disclosed, constitutes a preferred form, it is to be understood that other forms might be adopted, as may come within the scope of the claims which follow.

What is claimed is as follows:

1. A heating arrangement comprising a space to be heated, heating means for said space, a clock, an on indicator on said clock, an off indicator on said clock, a thermostat responsive to temperature in said space and controlling said heating means, control manipulating means for said thermostat having off and temperature settings, means automatically responsive when said control manipulating means is positioned at a temperature setting and said indicators are positioned at a different on time from an off time to place said clock in control of said thermostat to start a heating cycle at said on time and terminate said heating cycle at said off time, and means automatically positioning said control manipulating means at said off setting when said clock reaches said off time.

2. A heating arrangement comprising a space to be heated, heating means for said space, a clock, an on indicator on said clock, an off indicator on said clock, a thermostat responsive to temperature in said space and controlling said heating means, control manipulating means for said thermostat having off and temperature settings, means automatically responsive when said control manipulating means is positioned at a temperature setting and said indicators are positioned at a different on time from an off time to place said clock in control of said thermostat to start a heating cycle at said on time and terminate said heating cycle at said off time, and means automatically taking said clock out of control of said thermostat and automatically positioning said control manipulating means at said off setting when said clock reaches said off time.

3. A heating arrangement comprising a space to be heated, heating means for said space, a clock, an on indicator on said clock, an off indicator on said clock, a thermostat responsive to temperature in said space and controlling said heating means, an adjusting manipulator for said thermostat having off and temperature settings, and means automatically responsive to the positioning of said manipulator at a temperature setting and the positioning of said on indicator at a different on time from the positioning of said off indicator at an off time for placing said clock in control of said thermostat to start a heating period at said on time and terminate said heating period at said off time and to carry said on indicator to substantial time coincidence with said off indicator.

4. A heating arrangement comprising a space to be heated, heating means for said space, a clock, an on indicator on said clock, an off indicator on said clock, a thermostat responsive to temperature in said space and controlling said heating means, an adjusting manipulator for said thermostat having off and temperature settings, and means automatically responsive to the positioning of said manipulator at a temperature setting and the positioning of said on indicator at a different on time from the positioning of said off indicator at an off time for placing said clock in control of said thermostat to start a heating period at said on time and terminate said heating period at said off time and to position said manipulator at said off setting.

5. A heating arrangement comprising a space to be heated, heating means for said space, a clock, an on indicator on said clock, an off indicator on said clock, a thermostat responsive to temperature in said space and controlling said heating means, an adjusting manipulator for said thermostat having off and temperature settings, and means automatically responsive to the positioning of said manipulator at a temperature setting and the positioning of said on indicator at a different on time from the positioning of said off indicator at an off time for placing said clock in control of said thermostat to start a heating period at said on time and terminate said heating period at said off time and to carry said on indicator to substantial time coincidence with said off indicator and to position said manipulator at said off setting.

6. A heating arrangement comprising a space to be heated, heating means for said space, a clock, an on indicator on said clock, an off indicator on said clock, a thermostat responsive to temperature in said space and controlling said heating means, means automatically responsive when said indicators are positioned at a different off time from an on time to place said clock in control of said thermostat to start a heating period at said on time and to carry said on indicator to substantial time coincidence with said off indicator and to take said clock out of control of said thermostat at said off time.

7. A heating arrangement comprising a space to be heated, heating means for said space, a clock an on indicator on said clock, an off indicator on said clock, a thermostat responsive to temperature in said space and controlling said heating means, an adjusting thermostat manipulator having an off position and temperature positions, means for placing said clock in control of said thermostat when said on and off indicators are positioned at a different on time from an off time to start a heating period at the on time selected by said on indicator and to terminate said heating period at the time selected by said off indicator, means automatically to place said thermostat in control of said heating means when said thermostat manipulator is positioned at a temperature position, means to carry said on indicator to substantial time coincidence with said off indicator and to take said clock out of control of said thermostat at said off time, and means automatically moving said thermostat manipulator to said off position substantially at said off time.

8. A heating arrangement comprising, a space to be heated, heating means for said space, a clock, an on indicator on said clock, an off indicator on said clock, a thermostat responsive to temperature in said space and controlling said heating means, means automatically responsive to the setting of said on and off indicators to place said clock in control of said thermostat to start a heating period at the time selected by the setting of said on indicator and to terminate said heating period at the time selected by the setting of said off indicator, and means automatically taking said clock out of control of said thermostat at said last named time until one of said indicators has been reset.

9. A heating arrangement comprising an electrical power source, a space to be heated, electric heating means for said space, an electric clock connected to said source, an on indicator on said clock, an off indicator on said clock, a thermostat responsive to temperature in said space, thermostat control manipulating means for said thermostat having off and temperature settings, means automatically placing said thermostat in control of said heating means when said control manipulating means is at a said temperature setting and taking said thermostat out of control of said heating means when said control manipulating means is at said off setting, clock-switch means connected to said thermostat to be open when said clock indicates a time prior to the on indicator and to be closed when said clock indicates a time at and after the on indicator, and master switch means automatically connecting said power source to said clock switch means when said indicators are positioned to different times and connecting said power source directly to said thermostat when said indicators are positioned substantially to the same time.

10. A heating arrangement comprising an electrical power source, a space to be heated, electric heating means for said space, an electric clock connected to said source, an on indicator on said clock, an off indicator on said clock, a thermostat responsive to temperature in said space, thermostat control manipulating means for said thermostat having off and temperature settings, means automatically placing said thermostat in control of said heating means when said control manipulating means is at a said temperature setting and taking said thermostat out of control of said heating means when said control manipulating means is at said off setting, clock-switch means connected to said thermostat to be open when said clock indicates a time prior to the on indicator and to be closed when said clock indicates a time at and after the on indicator, master switch means automatically connecting said power source to said clock switch means when said indicators are positioned to different times and connecting said power source directly to said thermostat when said indicators are positioned substantially to the same time, and means on said clock to carry said on indicator to substantial time coincidence with said off indicator as said clock time progresses from the on time to the off time.

11. A heating arrangement comprising an electrical power source, a space to be heated, electric heating means for said space, an electric clock connected to said source, an on indicator on said clock, an off indicator on said clock, a thermostat responsive to temperature in said space, thermostat control manipulating means for said thermostat having off and temperature settings, means automatically placing said thermostat in control of said heating means when said control manipulating means is at a said temperature setting and taking said thermostat out of control of said heating means when said control manipulating means is at said off setting, clock switch means connected to said thermostat to be open when said clock indicates a time prior to the on indicator and to be closed when said clock indicates a time at and after the on indicator, master switch means automatically connecting said power source to said clock switch means when said indicators are positioned to different times and connecting said power source directly to said thermostat when said indicators are positioned substantially to the same time, means on said clock to carry said on indicator to substantial time coincidence with said off indicator as said clock time progresses from the on time to the off time, and means automatically driving said thermostat control manipulating means if previously set at a temperature setting to said off setting substantially when said clock time progresses to the off time.

12. A heating arrangement comprising an electrical power source, a space to be heated, electric heating means for said space, an electric clock connected to said source, an on indicator on said clock, an off indicator on said clock, a thermostat responsive to temperature in said space, thermostat control manipulating means for said thermostat having off and temperature settings, means automatically placing said thermostat in control of said heating means when said control manipulating means is at a said temperature setting and taking said thermostat out of control of said heating means when said control manipulating means is at said off setting, clock switch means connected to said thermostat to be open when said clock indicates a time prior to the on indicator and to be closed when said clock indicates a time at and after the on indicator, master switch means automatically connecting said power source to said clock switch means when said indicators are positioned to different times and connecting said power source directly to said thermostat when said indicators are positioned substantially to the same time, means on said clock to carry said on indicator to substantial time coincidence with said off indicator as said clock time progresses from the on time to the off time, and electric motor means automatically driving said thermostat control manipulating means if previously set at a temperature setting to said off setting substantially when said clock time progresses to the off time.

13. A heating arrangement comprising an electrical power source, a space to be heated, electric heating means for said space, an electric clock connected to said source, an on indicator on said clock, an off indicator on said clock, a thermostat responsive to temperature in said space, thermostat control manipulating means for said thermostat having off and temperature settings, means automatically placing said thermostat in control of said heating means when said control manipulating means is at a said temperature setting and taking said thermostat out of control of said heating means when said control manipulating means is at said off setting, clock switch means connected to said thermostat to be open when said clock indicates a time prior to the on indicator and to be closed when said clock indicates a time at and after the on indicator, master switch means automatically connecting said power source to said clock switch means when said indicators are positioned to different times and connecting said power source directly to said thermostat when said indicators are positioned substantially to the same time, means on said clock to carry said on indicator to substantial time coincidence with said off indicator as said clock time progresses from the on time to the off time, and clutch means powered from said electric clock automatically driving said thermostat control manipulating means if previously set at a temperature setting to said off setting substantially when said clock time progresses to the off time.

14. A heating arrangement comprising an electrical power source, a space to be heated, electric heating means for said space, an electric clock connected to said source, an on indicator on said clock, an off indicator on said clock, a thermostat responsive to temperature in said space, thermostat control manipulating means for said thermostat having off and temperature settings, means automatically placing said thermostat in control of said heating means when said control manipulating means is at a said temperature setting and taking said thermostat out of control of said heating means when said control manipulating means is at said off setting, clock switch means connected to said thermostat to be open when said clock indicates a time prior to the on indicator and to be closed when said clock indicates a time at and after the on indicator, master switch means automatically connecting said power source to said clock switch means when said indicators are positioned to different times and connecting said power source directly to said thermostat when said indicators are positioned substantially to the same time, means on said clock to carry said on indicator to substantial time coincidence with said off indicator as said clock time progresses from the on time to the off time, and spring means automatically driving said thermostat control manipulating means if previously set at a temperature setting to said off setting substantially when said clock time progresses to the off time.

15. A heating arrangement comprising an electrical power source, a space to be heated, electric heating means for said space, an electric clock connected to said source, an on indicator on said clock, an off indicator on said clock, a thermostat responsive to temperature in said space, thermostat control manipulating means for said thermostat having off and temperature settings, means automatically placing said thermostat in control of said heating means when said control manipulating means is at a said temperature setting and taking said thermostat out of control of said heating means when said control manipulating means is at said off setting, clock switch means connected to said thermostat to be open when said clock indicates a time prior to the on indicator and to be closed when said clock indicates a time at and after the on indicator, master switch means automatically connecting said power source to said clock switch means when said indicators are positioned to different times and connecting said power source directly to said thermostat when said indicators are positioned substantially to the same time, means on said clock to carry said on indicator to substantial time coincidence with said off indicator as said clock time progresses from the on time to the off time, spring means automatically driving said thermostat control manipulating means if previously set at a temperature setting to said off setting substantially when said clock time progresses to the off time, and manual release means for causing said spring means to drive said thermostat control manipulating means from a temperature setting to said off setting.

16. A heating arrangement comprising a space to be heated, heating means for said space, a clock, an on indicator on said clock, an off indicator on said clock, a thermostat responsive to temperature in said space and controlling said heating means, control manipulating means for said thermostat having off and temperature settings, means automatically responsive when said control manipulating means is positioned at a temperature setting and said indicators are positioned at a different on time from an off time to place said clock in control of said thermostat to start a heating cycle at said on time and terminate said heating cycle at said off time, and a lamp to differentiate other conditions from the condition when said control manipulating means has been set at a temperature setting and said on and off indicators have been positioned at different times.

17. In combination: a source of electrical power; a device to be energized from said source; a control switch for said device between said source and device having on and off positions; a timer having a time indicator, a timer switch, an on timer switch actuator and an off timer switch actuator; means causing said on timer switch actuator to follow said time indicator while said actuator and indicator are in coincidence until said on timer switch actuator is in substantial coincidence with said off timer switch actuator; means placing said control switch and timer switch in joint control of said device when said actuators are separated and taking said timer switch out of control of said device when said actuators are in substantial coincidence; and means automatically changing said control switch from on position to off position when said actuators are brought into coincidence.

18. In combination: a source of electrical power; a device to be energized from said source; a control switch for said device between said source and device having on and off positions; a timer having a time indicator, a timer switch, an on timer switch actuator and an off timer switch actuator; means causing said on timer switch actuator to follow said time indicator while said actuator and indicator are in coincidence until said on timer switch actuator is in substantial coincidence with said off timer switch actuator; means placing said control switch and timer switch in joint control of said device when said actuators are separated and taking said timer switch out of control of said device when said actuators are in substantial coincidence; means automatically changing said control switch from on position to off position when said actuators are brought into coincidence; and means permitting the subsequent setting of said control switch in on position while said actuators are in substantial coincidence.

19. In combination: a device to be electrically energized; a clock; an on indicator on said clock; an off indicator on said clock; a switch controlling the energization of said device; control manipulating means for said switch having off and on settings; means automatically responsive when said control manipulating means is positioned at an on setting and said indicators are positioned at a different on time from an off time to place said clock in control of said switch to start an energizing cycle at said on time and terminate said cycle at said off time; means automatically positioning said control manipulating means at said off setting when said clock reaches said off time; and means automatically permitting the subsequent setting of said control manipulating means at an on setting to energize said device independently of said clock until said on and off indicators are reset.

ROBERT R. CANDOR.

REFERENCES CITED

The following references are of record in the file of this patent:

UNITED STATES PATENTS

| Number | Name | Date |
|---|---|---|
| 1,990,342 | Mongelli et al. | Feb. 5, 1935 |
| 1,416,009 | Forshee | May 16, 1922 |
| 1,758,619 | Phillips | May 13, 1930 |
| 2,276,930 | Clark | Mar. 17, 1942 |
| 1,495,020 | Hall | May 20, 1924 |
| 2,166,683 | Grayson | July 18, 1939 |
| 2,224,593 | Brown et al. | Dec. 10, 1940 |
| 2,300,950 | Lux | Nov. 3, 1942 |
| 2,301,942 | Gallagher | Nov. 17, 1942 |
| 2,302,625 | Gallagher et al. | Nov. 17, 1942 |
| 2,310,527 | Huff | Feb. 9, 1943 |
| 2,392,166 | Lockwood | Jan. 1, 1946 |